US008201148B2

(12) United States Patent
Solirov et al.

(10) Patent No.: US 8,201,148 B2
(45) Date of Patent: Jun. 12, 2012

(54) GUIDED DEVELOPMENT AND TESTING FOR COMPUTER CODE

(75) Inventors: Dimitar V. Solirov, Sofia (BG); Dimitar P. Alexandrov, Sofia (BG); Anton Hr. Andronov, Sofia (BG); Boris Vi. Angelov, Sofia (BG); Stamen G. Kotehkov, Sofia (BG); Frank Sehertel, Waldorf (DE)

(73) Assignee: SAP AG, Walldorf (DE)

( * ) Notice: Subject to any disclaimer, the term of this patent is extended or adjusted under 35 U.S.C. 154(b) by 1499 days.

(21) Appl. No.: 11/681,879

(22) Filed: Mar. 5, 2007

(65) Prior Publication Data
US 2008/0222606 A1 Sep. 11, 2008

(51) Int. Cl.
*G06F 9/44* (2006.01)
*G06F 9/45* (2006.01)

(52) U.S. Cl. ........ 717/122; 717/124; 717/126; 717/140; 717/102

(58) Field of Classification Search .................. None
See application file for complete search history.

(56) References Cited

U.S. PATENT DOCUMENTS

| 6,769,114 | B2 | 7/2004 | Leung | 717/124 |
|---|---|---|---|---|
| 7,031,787 | B2 | 4/2006 | Kalthoff et al. | 700/105 |
| 7,080,351 | B1 | 7/2006 | Kirkpatrick et al. | 717/102 |
| 7,124,401 | B2 | 10/2006 | Muller et al. | 717/124 |
| 7,159,206 | B1 | 1/2007 | Sadhu et al. | 717/101 |
| 7,174,535 | B2 | 2/2007 | Wragge | 717/107 |
| 7,185,235 | B2 | 2/2007 | Radestock | 714/47 |
| 7,840,944 | B2* | 11/2010 | Brunswig et al. | 717/124 |
| 2006/0248517 | A1* | 11/2006 | Bartsch et al. | 717/140 |
| 2008/0120598 | A1* | 5/2008 | Imeshev | 717/120 |

OTHER PUBLICATIONS

Grimstead, Ian J, et al., "Visualization Across the Pond: How a Wireless PDA can Collaborate with Million-Polygon Datasets via 9,000km of Cable", *Proceedings of the tenth international conference on 3D Web technology*, (2005), 47-56.
"Architecture and Concepts of the Change Management Service", http://help.sap.com/saphelp_nw04/helpdata/en/31/ef4c4005a99523e10000000a1550b0/con . . . , Downloaded Jan. 25, 2007,1.
"Architecture and Concepts of the Component Build Service", http://help.sap.com/saphelp_nw04/helpdata/en/8d/0c3736db115f4b8ce3fc716e3a386c/con . . . , Downloaded Jan. 25, 2007,1.
"Design Time Repository", http://help.sap.com/saphelp_nw04/helpdata/en/95/3dbe3be3e9d949961a6a4469b59a83/con . . . , Downloaded Jan. 25, 2007,2.
"SAP Java Test Tools", http://help.sap.com/saphelp_nw04/helpdata/en/cl/c6213e225f9a0be10000000a114084/con . . . Downloaded Jan. 25, 2007,1.

(Continued)

*Primary Examiner* — Lewis A Bullock, Jr.
*Assistant Examiner* — Mark Gooray
(74) *Attorney, Agent, or Firm* — Schwegman, Lundberg & Woessner, P.A.

(57) ABSTRACT

A method and apparatus for a guided procedure development and testing for computer code. An embodiment of a method includes receiving a component for a software program, and storing the component in an inactive state. A new version of the software program is built, the new version being limited to the component stored in the inactive state and one or more components of the software program that are in an active state, with the new version being built in the inactive state. If the building of the new version is successful, then the new version of the software program is tested. If the testing of the new version is successful, then the component is moved into the active state.

13 Claims, 6 Drawing Sheets

OTHER PUBLICATIONS

"SAP Netweaver Java Development Infrastructure", http://help.sap.com/saphelp_nw04/helpdata/en/01/9c4940d1ba6913e10000000a1550b0/co . . . Downloaded Jan. 25, 2007,1-3.

"The SAP Netweaver Developer Studio", http://help.sap.com/saphelp_nw04/helpdata/en/cb/f4bc3d42f46c33e10000000a11405a/con . . . Downloaded Jan. 25, 2007,1.

"Working With the SAP Netweaver Java Development Infrastructure", http://help.sap.com/saphelp_nw04/helpdata/en/03/f6bc3d42f46c33e10000000a11405a/cont . . . Downloaded Jan. 25, 2007,1-2.

Hengevoss, Wolf , et al., "Streaming Large-Scale Java Development Projects With SAP NetWeaver Application Server", *Dell Power Solutions*, May 2006, www.dell.com/powersolutions, (2006),83-86.

Kessler, Karl, "SAP NetWeaver Developer Studio and JAVA Development Infrastructure", SAP AG JAVA201,(2003),13.

Razachk, Abdul , "NetWeaver Development Infrastructure", SAP AG JAVA Development Infrastructure Overview,(2004),17.

Yuvaraj, Athur R., "Features of the SAP NetWeaver Development Infrastructure", SAP Labs India Private Limited 138 EPIP, Whitefield, Bangalore, India 560066,(2005),1-20.

Zhang, Yu-Nong , et al., "SAP NetWeaver JAVA Development Infrastructure", SAP AG, SAP Netweaver JDI,(2004),25.

Zhang, Yu-Nong , et al., "Session ID: JAVA102 JAVA Development Infrastructure (JDI)—Overview—", SAP TechEd / JAVA102 / Overview Print / 5,(2004),30.

* cited by examiner

US 8,201,148 B2

GUIDED DEVELOPMENT AND TESTING FOR COMPUTER CODE

TECHNICAL FIELD

Embodiments of the invention generally relate to the field of computer system development and, more particularly, to a method and apparatus for guided development and testing for computer code.

BACKGROUND

In the development of modern computer processes, many parties are involved at various different stages. The coordination of the many different involved parties has been a constant challenge for developers of complex software.

As systems become larger over time, effective coordination has become both more difficult and more essential. In the development of very large projects stability is critical, and ensuring regular deliveries of software components is extremely important in order to successfully bring a project to completion.

However, in a complex computer software development environment numerous software components may be developed in parallel at overlapping times, with each component potentially affecting each other component. The stability of a project in such an environment is very difficult to track. The various parties in development may find it difficult to determine whether a system is sufficiently stable at any particular point in time to allow the successful incorporation of new changes.

Because of this circumstance, the development of a project may be delayed. In a conventional environment, it may be necessary to rework changes if system stability is compromised, to delay development or incorporation of components until further assurance of system stability can be obtained, or to back out of changes that have been made if it is discovered that the changes were incorporated prematurely into the system.

SUMMARY OF THE INVENTION

A method and an apparatus for guided development and testing for computer code are provided.

In one aspect of the invention, a method includes receiving a component for a software program, and storing the component in an inactive state. A new version of the software program is built, the new version being limited to the component stored in the inactive state and one or more elements of the software program that are in an active state, with the new version being built in the inactive state. If the building of the new version is successful, then the new version of the software program is tested. If the testing of the first new version is successful, then the component is moved into the active state.

In another aspect of the invention, a code development system includes a design storage module, where the design repository module includes an inactive workspace and an active workspace. The inactive workspace is to receive one or more new software components, and the active workspace is to hold one or more software components that have been successfully build and tested. The system further includes a build machine module to build versions of software based on software components held in the workspaces of the design storage module, and a change management service module to manage the design storage module and the build machine module.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
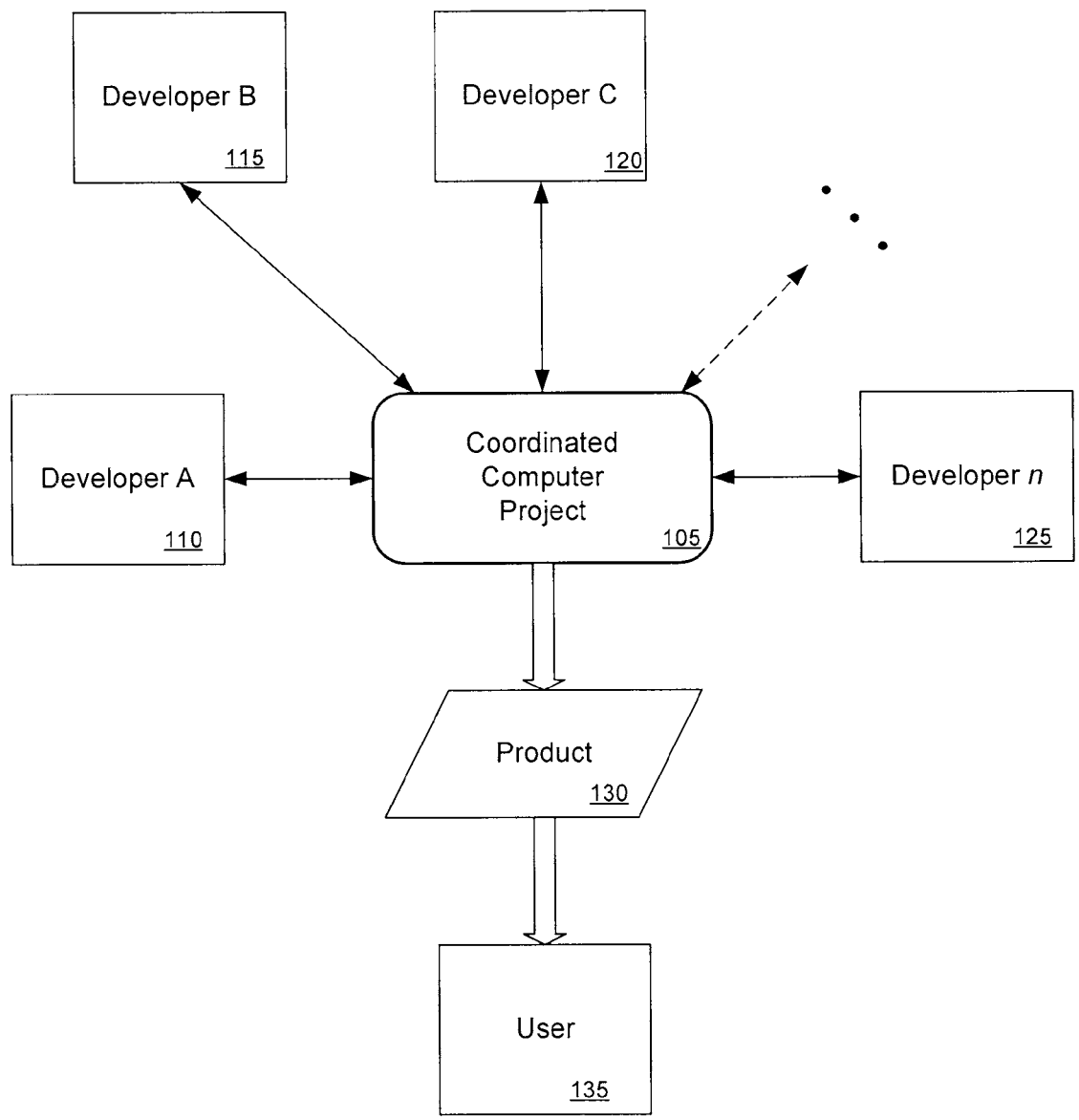
FIG. 1 illustrates an embodiment of a coordinated computer project.

Embodiments of the invention are generally directed to guided procedure development and testing for computer code.

As used herein, "developer" means any person, group of persons, or system that develops a portion of a computer code project.

As used here, "build" means to put individual coded components of a program together. In addition, "build" may refer to a version of a program. In general, a build is a pre-release version of software, identified by a build number. Repeated builds generally make up the development process. Building may include repeatedly collecting components together and compiling such components for testing purposes to eventually generate a final product.

As used herein, "build machine" means a module or system for building a software program. A "build machine" may also be referred to as a "build server".

As used herein, "software project" means any project to develop a software program or other computer code. The term "software project" includes commercial products, products for internal use of an entity, or any other development of software.

As used herein, "development component" means a subpart of a software project that is generated by a developer.

In an embodiment of the invention, an optimized development and test process for development of computer software is established. In an embodiment of the invention, a system is established to increase available development time by minimizing wasted operations and ensuring early problem detection. In particular, the system operates to maintain a stable active workspace for a build machine or build server, including, but not limited to, the component build service (CBS) of SAP AG. In an embodiment of the invention, a process provides for a stable and efficient environment for the development of complex code with multiple developers.

In an embodiment of the invention, stability of an active workspace for software development is maintained when a development component is incorporated by building the software in an inactive state, with the software build including only the necessary elements for the new component. At this stage in the software development process, software is not fully synchronized with all elements, but is instead only synchronized as needed for the current development. All elements from an active workspace are synchronized, but only the needed element or elements from an inactive workspace are synchronized. The resulting software build is then used only for test purposes. In an embodiment, the stability of the build is then established through testing prior to transferring the component into an active state.

In an embodiment of the invention, a responsible party is designated for each development component and for each test case for the testing of software. In an embodiment of the invention, the responsible parties are automatically notified of issues when such issues arise, with notification occurring before the code is activated and thus endangers the active workspace. For example, a central build is prepared based on the reported development component. In an embodiment of the invention, the responsible party for the development component is automatically notified if a build incorporating the development component is not successful. If the build is successful, then a series of tests are run to verify the build. In an embodiment of the invention, the responsible party for a test case is automatically notified if a software build fails the required testing.

In an embodiment of the invention, a tool is provided for collecting and coordinating changes made by developers. In an embodiment of the invention, the tool is utilized to provide a stable active workspace for developers that is always built and tested. In an embodiment of the invention, each entity or person who is involved in a development process is responsible for providing a report regarding any changes being made to a system under development, and the tool coordinates the incorporation of such changes to maintain stability for development.

In an embodiment, new development components are deployed into a project using a central build of the software, rather than such builds being generated by each developer. In this embodiment, there is no synchronized build and deployment of all components locally by any developer. In an embodiment, the central build may be executed one or more times per day at appointed times. In one possible example, a build may be generated at the beginning of a work day and at an end of a work day, with a status report being provided if a build is successful. In an embodiment, a developer is required to develop unit and integration tests for any development component, and is required to identify responsible parties for verifying any change. The developer then checks in any development component in an inactive state, without any activation of the component.

In an embodiment, quality management (QM) establishes and maintains central test procedures. The QM obtains information for changes for a particular day, and schedules test procedures as needed to synchronize the component from an inactive state and all other components from the active state. The QM then checks the results of the build, and tests the build. If the components build is unsuccessful, then the reason for the failure is determined and the responsible party is notified automatically. If test results are unsuccessful, then there is determination of the reason for the test failure, and the responsible party is notified automatically. Only after the software tests successfully are the changes activated. Once the changes are activated, then a suite of integration tests and acceptance tests may be run.

In an embodiment, a software change management process describes the flow of a software development, starting from the local development and continuing through to the deployment on a central production system. In this environment, a system landscape is established, with the landscape including design workspaces and software engines, such as J2EE engines. The components of the development system are used to support the various stages of the product process, such as development, consolidation, testing, and production. In this process, local developments by developers are brought into the production system in accordance with the system roles. In an embodiment, the development environment may include a development system, which may include the SAP NetWeaver Developer Studio, and a design storage, which may include the design time repository (DTR) of SAP AG.

In an embodiment of the invention, a software change management process commences with centrally creating workspaces in the design storage for the development of software elements. The development then begins with the creation of local projects or development configurations on developer machines. The developers then synchronize their development environments with the workspace structure of the design storage, and under this structure set up a development project in the development environment. In this process, if any projects have been defined centrally, the developers may import the existing projects into their environments for development. In a particular implementation, the developers for a project may load the required resources (including, of example, folders, source files, and metadata) down to their computers and then proceed to make such modification to the source code as are necessary.

In a development process, the developers generally develop and test their changes locally until such changes have reached a stable state. After successful tests of the changes in the local server, the developers can load (or check in) the changed resources into the inactive workspace of the design storage. The sources are available for the build for the central development system, but are not available to other developers at this stage.

In an embodiment of the invention, the build machine then is responsible for building the software. In an embodiment, the build includes the new component obtained from the inactive work space, with all other components being drawn from the active workspace. Upon a successful build and successful testing of the build, the compiled version is placed in a first development (DEV) build space of the build machine, and the new component is activated by moving it from the inactive workspace to the active workspace.

In continuing the development process, a system administrator, or other agent responsible for administrative tasks, may synchronize the central development server at certain given time intervals, including all changes in the active workspace of the design storage. In an embodiment of the invention, the system administrator copies all changes from the active workspace into a second consolidation (CONS) build space. The system administrators may define a schedule which determines the times at which changes are copied. In this manner, the system administrators copy only those changes which have resulted in success in the previous build and deployment into the central development system.

A software project may be developed in a particular development infrastructure. In an embodiment of the invention, the elements of the development infrastructure are utilized to establish a guided development and test process for software. In one example, the software project is a Java development. A development infrastructure for the software project may include, but is not limited to, the SAP NetWeaver Java Development Infrastructure (NWDI) of SAP AG. In an embodiment of the invention, an optimized development and test process for computer systems is based on NWDI.

A development infrastructure may include multiple components, the possible components including:

(1) The design storage, which may include, but is not limited to, the design time repository (DTR) of SAP AG, is a repository for changes that provides for file versioning. In an embodiment of the invention, the design storage may include two workspaces, the inactive workspace and the active workspace. In general, after successful tests of code changes have been made on a local server, a developer checks the changed code into the inactive workspace of the design storage. The code is then available for the build for the central development system. In an embodiment of the invention, changes are made using software files in the inactive workspace (i.e., the code elements are in an inactive state), with the active workspace being reserved for successfully built source code files. After code changes have been successfully incorporated into a software build and have passed applicable testing, the code changes may be moved from the inactive workspace to the active workspace (i.e., the code elements are transferred to an active state).

(2) A build machine is intended to build the code that is stored in the design storage, and to hold the build results. In one embodiment, the build machine may be the CBS (Component Build Service) of SAP AG, the CBS being part of the SAP NetWeaver Java Development Infrastructure. In an embodiment of the invention, the build machine is used for the central build of source codes. In an embodiment of the invention, the system administrator may define a schedule to establish the times at which changes are built. The build machine includes a first build space and a second build space, the first build space being a development (DEV) build space for building of software using new components, and the second build space being a consolidation (CONS) build space for building consolidated versions of the software. In an embodiment of the invention, the build machine is utilized to build new components, with the software build including a new component drawn from the inactive design workspace and the remaining components being drawn from the active design workspace. If the software build is successful and testing of the software build is successful, the software build is stored in the DEV build space, and the new component is moved from the inactive design workspace to the active design workspace. Periodically the system administration may then synchronize the central development server with all changes in the active design workspace. In this example, a system administrator copies all existing active changes, which were provided by developers to the inactive design workspace and then moved to the active workspace upon successful building, and generates a consolidated build. If the consolidated build is successful and any required testing of the consolidated build is successful, is the software build is held in the CONS build space.

(3) A system landscape directory (SLD), the system landscape directory being the central information provider in a system landscape.

(4) A change management service (CMS) to manage the transport of software changes within a development, including a SAP Java development landscape. The functions of the CMS may be closely interlinked with the design storage, the build machine, and the system landscape directory. As an administration tool, the CMS may be utilized to embed these components and links the individual elements to form a unit for use in realizing distributed development projects. In an embodiment, the CMS holds the track definitions for multiple software development tracks, each track developing one or more software components. The CMS manages the transport of activated components and archives of dependent software components between the development tracks. The union of a DEV build space and a CONS build space represents one development track.

In an embodiment of the invention, a development and testing process is provided that increases speed of development by allowing quicker code building and testing, thus reducing the wait time for developers. In an embodiment, the process allows a developer to obtain testing with lower likelihood of "breaking" other aspects of a project produced by other parties. In embodiment of the invention, the implementation of testing and development is shifted to a local server in order to minimize the impact of changes and delay activation of code until there is sufficient assurance of operational readiness and lack of impact on other code elements.

FIG. 1 illustrates an embodiment of a coordinated computer project. In this illustration, multiple developers, shown as developer A 110, developer B 115, developer C 120, through developer n 125, are jointly working on the computer project, shown as a coordinated computer project 105. Ultimately the project will provide a final product 130 to be provided to one or more users 135. However, the individual developments may overlap and interrelate in many different ways. Thus, it often is impossible for any change to be implemented by developer A 110 without affecting the development efforts of developers B 115 and C 120.

Among other issues, a product element that is produced by one of the developers needs to be synchronized with the rest of the project. However, despite testing of the element by the respective developer, the synchronized project may not be fully stable. The instability of the project then will affect the development efforts of each other developer.

In an embodiment of the system, a guided procedure development and test process is provided for the computer project 105. In an embodiment, the process provides a method for preventing conflicting development or unnecessary delays in development. In an embodiment of the invention, synchronization of a modification is initially limited to only the needed elements for the modification, with the software remaining inactive until testing has been successful. In an embodiment of the invention, modifications are not activated until the stability of the synchronized version is established. In an embodiment, all stable modifications will be periodically synchronized into a full build of the current state of the software.

Figure 2:
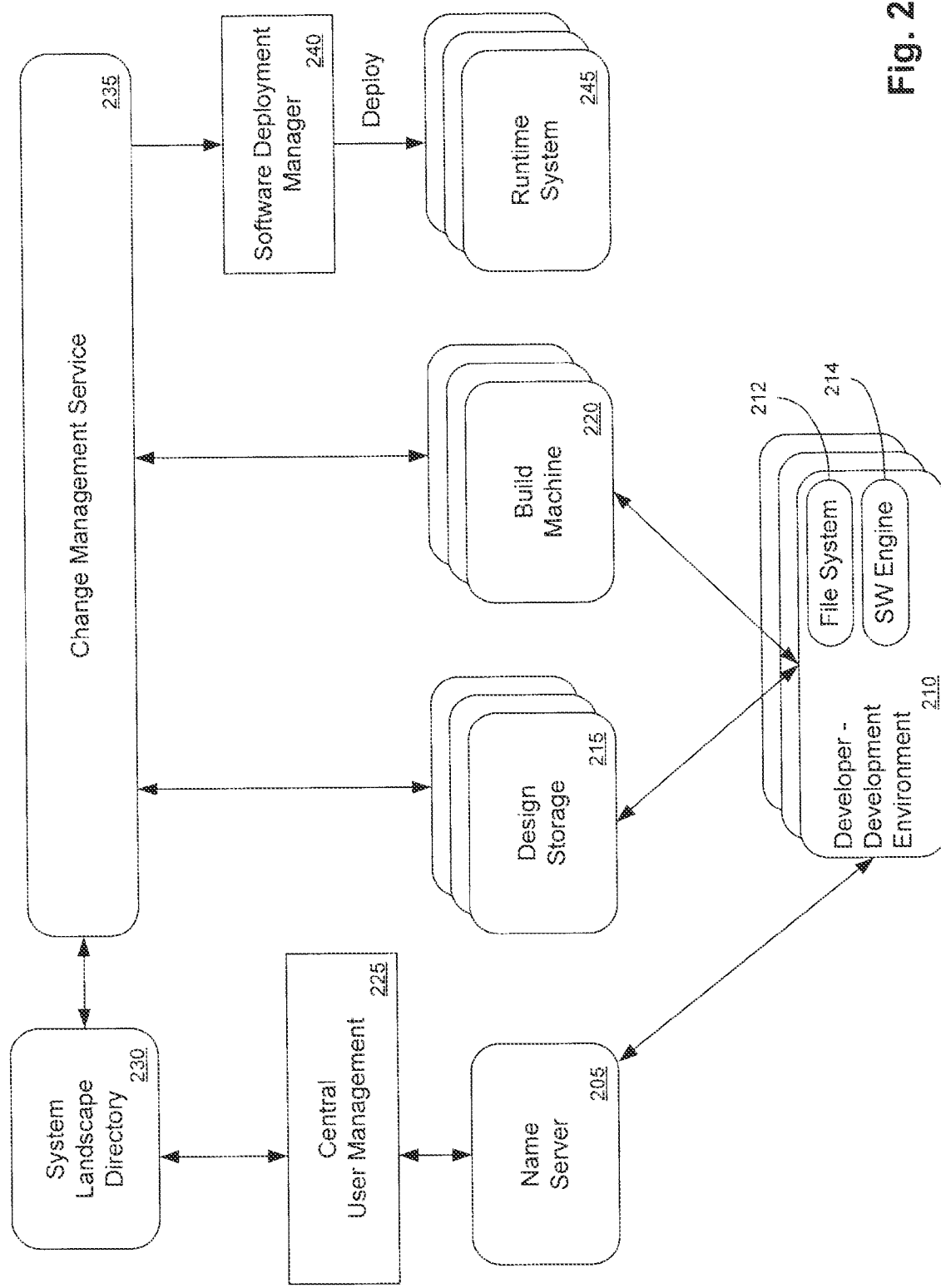
FIG. 2 is an illustration of an embodiment of a computer software development system.

FIG. 2 is an illustration of an embodiment of a computer software development system. While FIG. 2 provides a particular implementation, embodiments of the invention are not limited to the elements contained in this implementation. The elements provided may include software, hardware, or a combination of software and hardware. The elements presented here may be implemented in various modules or agents. In this illustration, a system landscape directory 230 may initially define a software product, and define one or more software components that form the product. The information may be directed to developers 210 via a central user management and a name server 205. Each developer 210 may utilize a development environment to develop one or more software components of the software project. The development environment provides for editing and building of objects for the project, and for ultimately releasing the developed objects for further processing. In this process, the developer 205 utilizes a local file system 212 for the storage of one or more portions of the complete software project, and utilizes a local software engine 214 for local test operation.

Figure 3A:
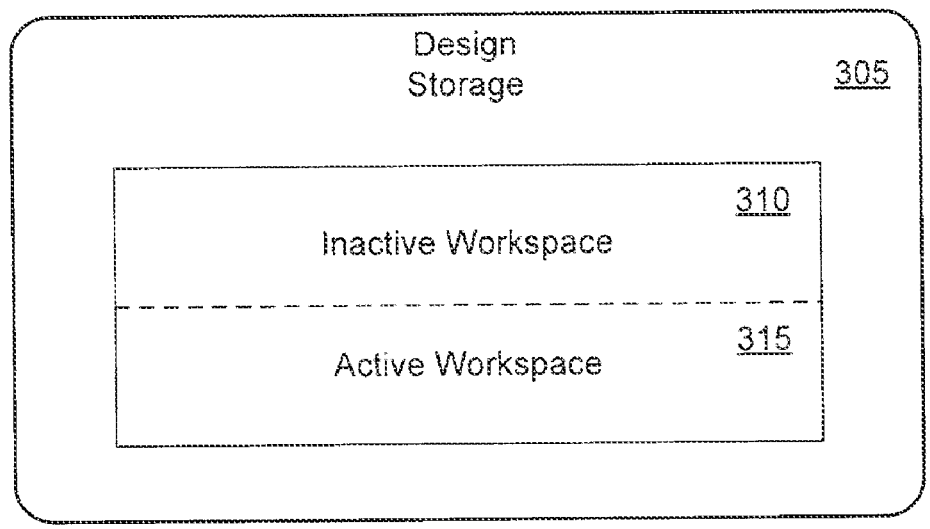
FIG. 3a is an illustration of a design repository utilized in an embodiment of the invention.

In an embodiment of the invention, if a user has completed development and local testing of a component of the project, the developer 210 provides the component to a design storage 215, which provides for central storage of the elements. As shown in FIG. 3a following, the design storage includes both an inactive workspace and an active workspace. The central infrastructure 225 further includes a change management service (CMS) 235, which is responsible for defining the development landscape. The CMS provides development configuration for each development state of a software component, and holds definitions of the development tracks in which software components are developed. In an embodiment of the invention, the developer 210 checks the component into the inactive workspace of the design storage 215 after local building and testing of the component.

In an embodiment of the invention, the change management service 235 utilizes a build machine 220 to build the code change that has been stored in the inactive workspace of the design storage 215. In an embodiment, the build machine 220 obtains the developed component from the inactive workspace of the design storage 215 and obtains all other components from the active workspace of the design storage 215. In an embodiment, the change management service 235 then does not activate the software build until the software build has been successfully tested in the inactive workspace. In an embodiment, a notice is sent automatically to a party responsible for the software build if a build of the software fails. In addition, a notice is sent automatically to a party responsible for a test case if a test of the software fails. The notices may be sent via, for example, one or more tools that are developed for this purpose. In an embodiment of the invention, if the building and testing of the software is successful, the change management service 235 activates the software build.

In an embodiment, the build machine 235 periodically takes all components from the inactive workspace of the design storage and generates a complete build of the software, with the consolidated build being stored only successful building and testing of the software. Upon completion of the development of the software, the change management service 235 provides the software to a software deployment manager 240 for deployment to a runtime system 245.

FIG. 3a is an illustration of a design storage utilized in an embodiment of the invention. The design storage may, for example, represent the design storage 215 illustrated in FIG. 2. The design storage 305 may include an active workspace 310 and inactive workspace 315. Embodiments of the invention are not limited to this particular implementation of workspace, but rather may include any workspace structure that includes both an inactive workspace and an active workspace for code development.

In an embodiment of the invention, the building and testing of a code modification is initially performed on a developer's local system. After the developer has performed the necessary build and test, the modification is checked into the inactive workspace 310 of the design storage 305. In an embodiment, a build is performed in the inactive workspace 310 using only the necessary elements for the modification from the inactive workspace 310 and the remaining elements being drawn from the active workspace 315. In this way, other modifications that are contained in the inactive workspace are not included in the build of the modification. The software build is then tested, and only after testing successfully is the code transferred to the active workspace 315 and activated.

In an embodiment, the stability of the active workspace is protected by building and testing code modifications in the inactive workspace 310, thereby reducing the chances that additional development will continue with unstable code. In an embodiment, the process is intended to reduce the time required by code correction, thereby increasing the time available for code development.

Figure 3B:
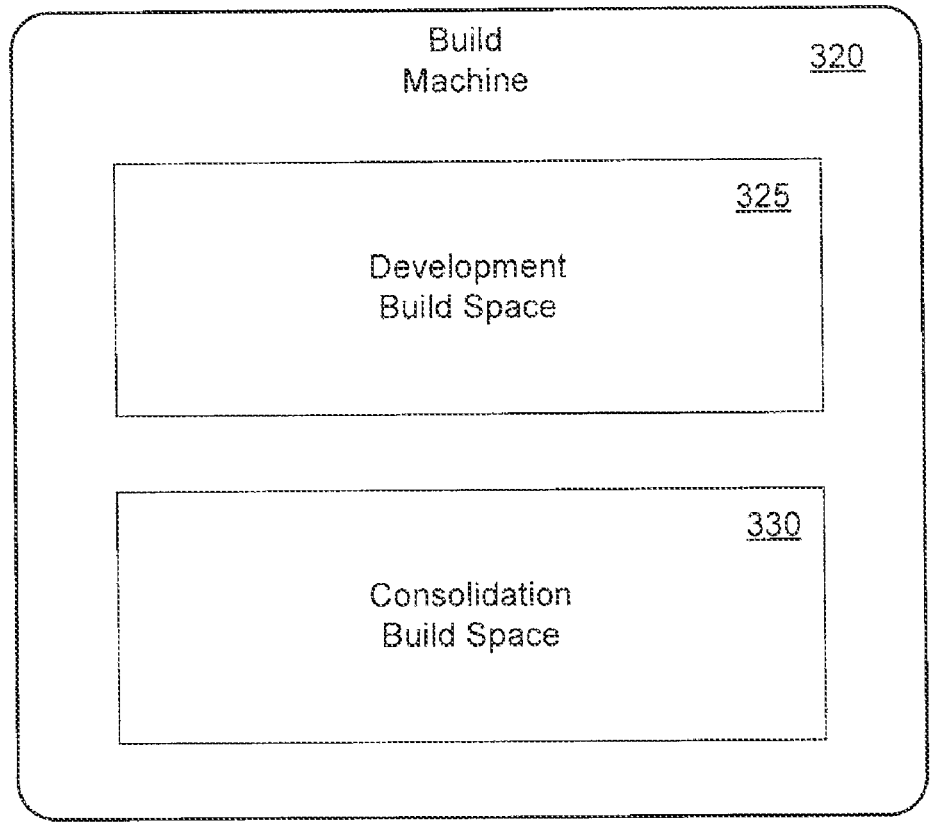
FIG. 3b is an illustration of a software build machine utilized in an embodiment of the invention.

FIG. 3b is an illustration of a build machine utilized in an embodiment of the invention. The illustrated build machine 320 may represent the build machine 220 illustrated in FIG. 2. In this illustration, the build machine 320 includes a development (DEV) build space 325 and a consolidation (CONS) build space 330. In an embodiment of the invention, the build machine operates to perform a software build by obtaining a new software component from an inactive workspace of a design storage, such as inactive workspace 310 of FIG. 3a, and obtaining the remaining components for the build from an inactive workspace of a design storage, such as active workspace 315 of FIG. 3a. In this way, the build is limited to the components necessary to determine the stability of the new component. If the build and testing are successful, then the software is activated by moving the component to the active workspace 315 of FIG. 3a, and storing the built software in the development build space 325 of the build machine.

In an embodiment of the invention, the software components may be consolidated periodically. In this operation, the build machine 320 obtains all active components from the active workspace 315 of FIG. 3a. Upon a successful build and testing, the consolidated build is stored in the consolidation build space 330. In this manner, the consolidation build is performed only using components for which stability has already been established.

Figure 4:
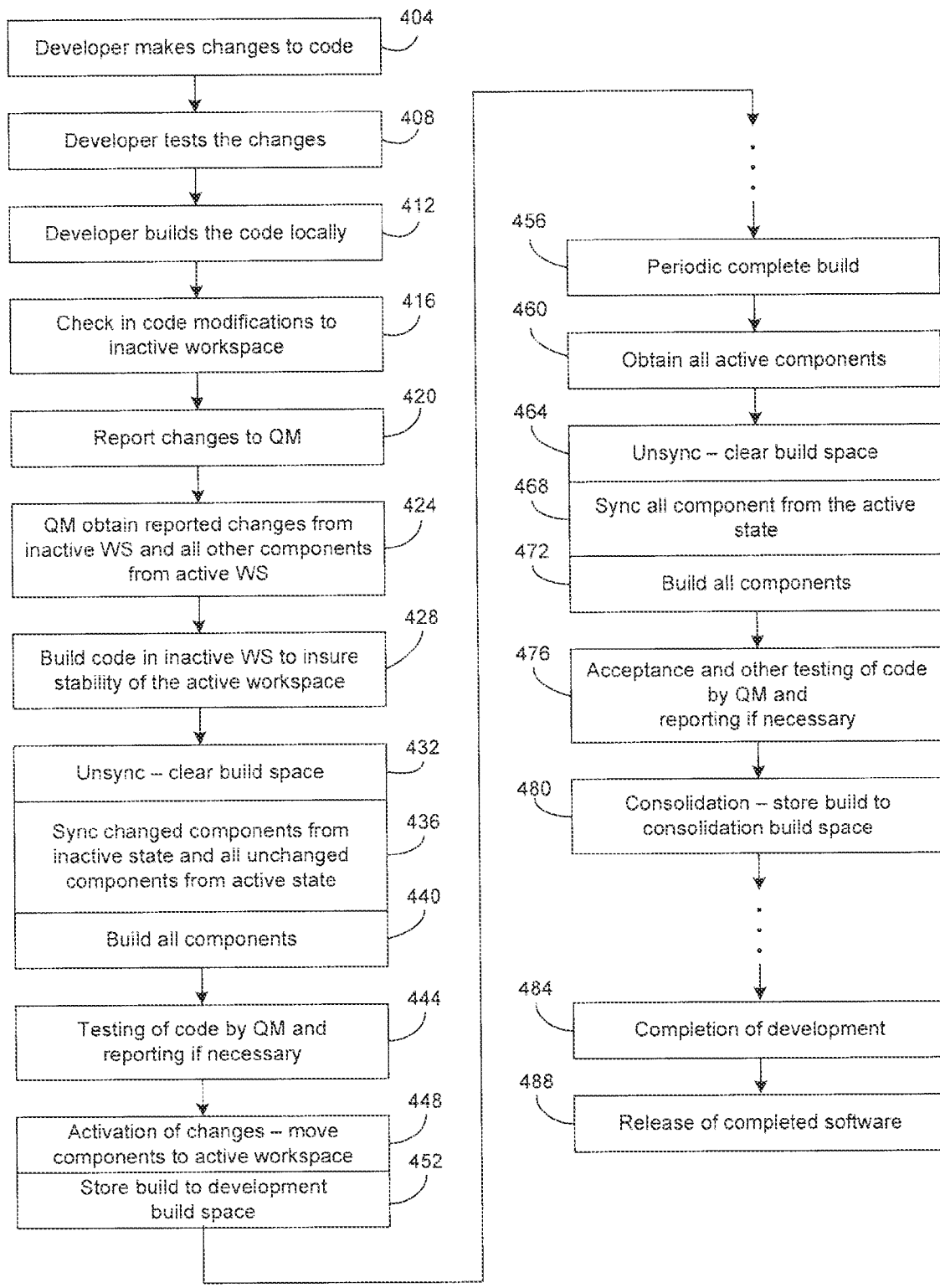
FIG. 4 is a flowchart to illustrate an embodiment of a process for code development and testing.

FIG. 4 is a flowchart to illustrate an embodiment of a process for code development and testing. In an embodiment of the invention, a developer makes a certain modification to computer code for a computer code project 404, the project being developed by multiple developers simultaneously. Following the development of the code modification, the developer will test the changes locally 408 and then build the code locally 412. If successful, the developer will check in the code modification in an inactive workspace of a design storage 416. The changes are reported to QM (quality management) 420.

The QM will obtain the reported changes from the inactive workspace, and will obtain all other elements for a build of the software from an active workspace 424. The code build is generated in the inactive workspace to preserve stability of the active workspace 428. The build proceeds by synchronizing to clear build space 432, synchronizing the changed components from the inactive workspace with all unchanged components from the active workspace 436, and building all the components 440. If the build is successful, the software is not yet activated. The code is tested as needed by QM, with reporting being made to responsible parties if testing is not successful 448. In an embodiment of the invention, if the testing is successful, the modified code provisions are then activated by moving the components to the active workspace, and the software build is stored in a development build space.

In an embodiment of the invention, periodically (for example, each week) a complete build of the software may be performed 456. To perform the build, all active components are obtained from the active workspace for consolidation 460. The build process includes unsynchronizing and clearing build space 464, synchronizing all components from the active state 468, and building all components 472. If the build is successful, then there is acceptance and other testing of the code as needed, with reporting being made to responsible parties if needed 476. Upon successful testing, the consolidated software build can be retained in the consolidation build space. The process of development may continue through cycles of development, testing, and consolidation unless the completion development 484 and release of the completed software 488.

Figure 5:
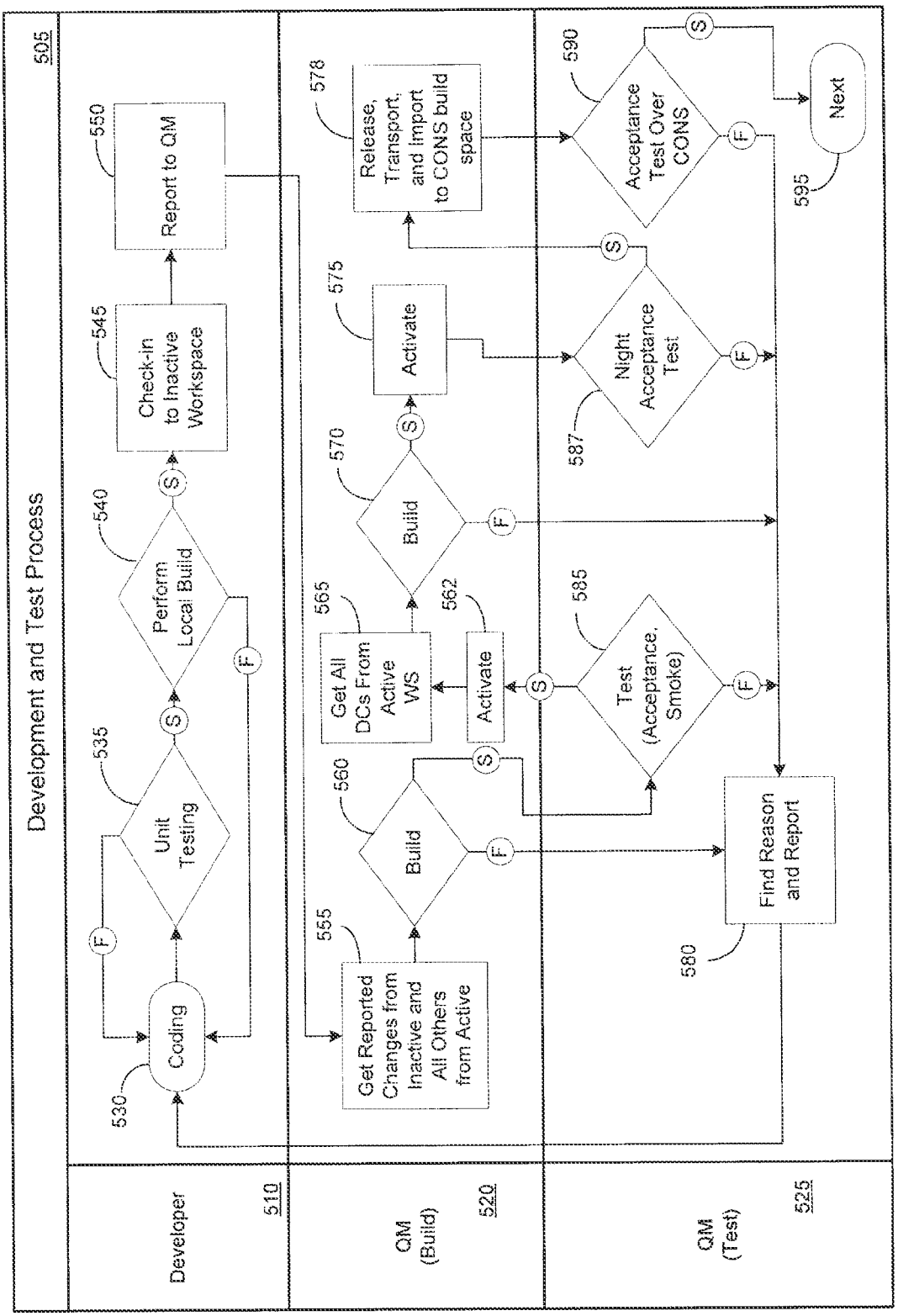
FIG. 5 is an illustration of an embodiment of a code development and test process.

FIG. 5 is an illustration of an embodiment of a code development and test process. In this illustration, the code development and test process 505 involves operations of a developer 510, QM for the code build 520 (referred to as QM(build)), and QM for testing of developed computer code 525 (referred to as QM(test)). In an embodiment, the process illustrated in FIG. 5 is utilized for most operations, while an urgent activation process may be used when normal activation procedures are insufficient because of time pressures that require quick activation of certain code.

In this illustration, the developer 510 prepares coding modifications 530 and performs local unit testing of the developed code 535. If the code test fails, it returns for further coding 530. If the code test is successful, then the process continues for performance of a local code build 540. If the local build is unsuccessful, the process again returns to further coding 530. If the local build is successful, the code is checked into the inactive workspace of the build storage 545. The developer does not activate the code. The QM is then notified regarding the developed code 550.

Continuing in the process, QM (build) 520 obtains the reported changes from the inactive workspace and obtains all other changes from the active workspace of the build storage 555, the components in the active storage having already been subject to testing for stability. A code build is then performed 560 by QM(build) 520, with the elements for the build being limited to the only the elements needed to evaluate this code modification. If the code build is a failure, the process proceeds to QM(test) 525 to find the reason for the failure and automatically reporting the failure 580, with the automatically generated report being sent to the responsible party for the build. The process then returns to coding 530 by the developer 510. If the build 560 is successful, then QM(test) 520 proceeds to test the code, performing tests including, but not limited to, an acceptance test or "smoke" tests 585. (A smoke test is a preliminary test to determine whether there are any major flaws that would prevent further testing. The smoke test includes a series of test operations, and is generally intended to address all areas of the code to determine whether any major problems are apparent.)

If the code fails such test, the process continues with QM(test) 525 determining the reason for the failure and automatically generating a report 580, the automatic report being sent to the responsible party for the test case. The process then returns to coding 530 by the developer 510. If the tests are successful 585, then the code component is activated by moving the component to the active workspace, and storing the build in the development build space 562. Periodically the QM may perform a consolidation of the active components. In this process, all development components (DCs) are obtained by QM(build) from the active workspace 565, and the full code is built 570. If the code build 570 is a failure, the process proceeds to QM(test) 525 to find the reason for the failure and automatically reporting the failure 580, with the automatically generated report being sent to the responsible party for the build. The process then returns to coding 530 by the developer 510. If the build 560 is successful, then QM(test) 520 proceeds to activate the code 575. At this point, the activated code may be provided to QM(test) for a night acceptance test 587. If the code fails such test, the process returns to QM(test) to determines the reason for the failure and provide a report, the process then returning to coding 530 by the developer 510. If the night acceptance test is successful 587, then the consolidated code is released, transported, and imported to the CONS build space 578. Thus, the transfer to the CONS workspaces for consolidation is made only after the stability of the change is established. An acceptance test then is performed over the consolidation build space 590, with the acceptance test being a formal test conducted to determine whether or not the system satisfies its acceptance criteria. If the code fails such test, the process proceeds to a determination of the reason for the failure and automatic provision of a report to the responsible party, the process then returning to coding 530 by the developer 510. The process then continues to any following operation 595 for the provision of the code to the intended consumers.

Figure 6:
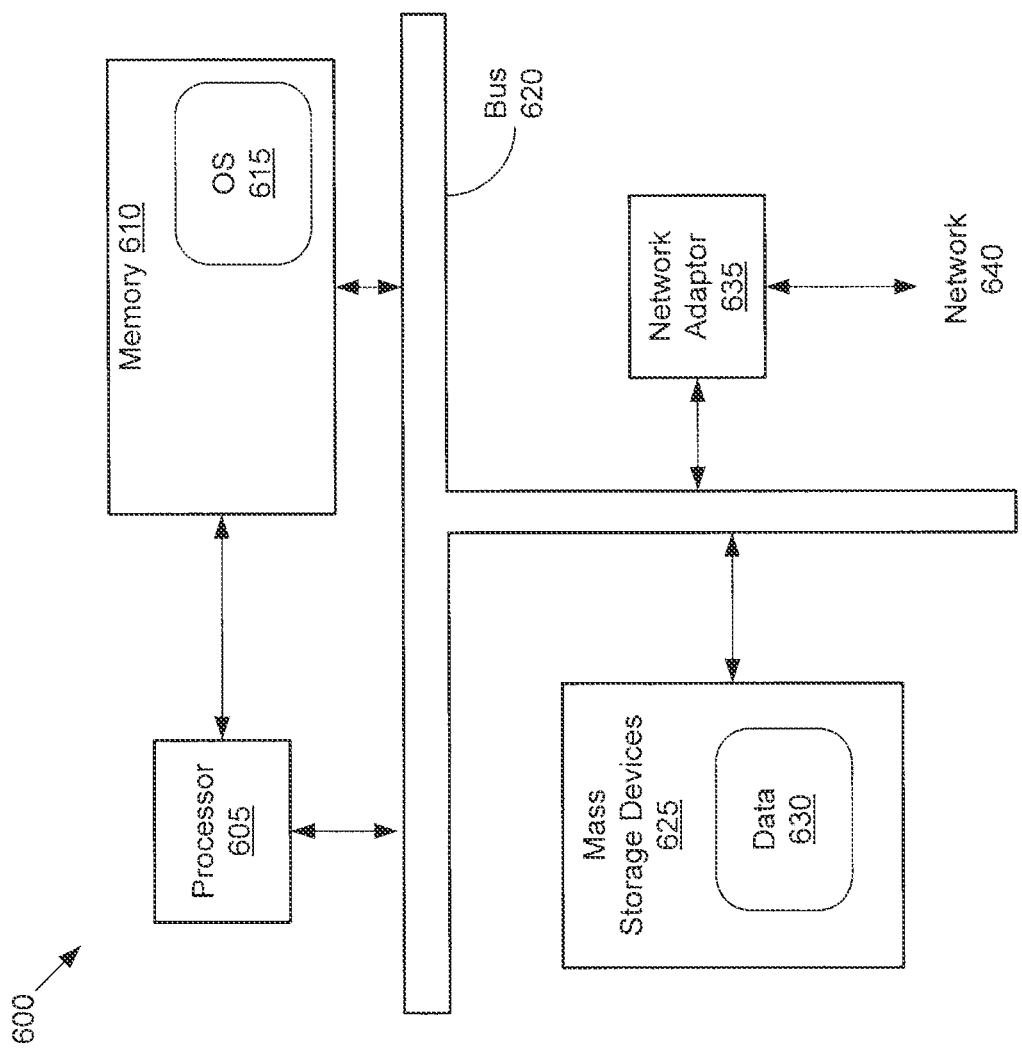
FIG. 6 is an illustration of a computer system in an embodiment of a software development and testing system.

FIG. 6 is an illustration of a computer system in an embodiment of a software development and testing system. A computer system 600 may include a system utilized for software development. In an embodiment of the invention, the computer system includes a guided procedure and test function for the development of computer code. The computing system illustrated in FIG. 6 is only one of various possible computing system architectures, and is a simplified illustration that does include many well-known elements. As illustrated, the computing system 600 can execute program code stored by an article of manufacture. Computer system 600 may be a J2EE system, ABAP system, or administration system. The computer system 600 includes one or more processors 605 and memory 610 coupled to a bus system 620. The bus system 620 is an abstraction that represents any one or more separate physical buses, point-to-point connections, or both connected by appropriate bridges, adapters, or controllers. The bus system 620 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements thereto)

As illustrated in FIG. 6, the processors 605 are central processing units (CPUs) of the computer system 600 and control the overall operation of the computer system 600. The processors 605 execute software stored in memory 610. A processor 605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. In an embodiment of the invention, the processors 605 are utilized in development of software and in the implementation of one or more modules of a software development system.

Memory 610 is or includes the main memory of the computer system 600. Memory 610 represents any form of random access memory (RAM), read-only memory (ROM), flash memory, or the like, or a combination of such devices. Memory 610 stores, among other things, the operating system 615 of the computer system 600. The memory 610 may further store software that is development in a guided testing and development process for computer code. The memory 610 may include multiple workspaces and build spaces for the development of software.

Also connected to the processors 605 through the bus system 620 are one or more internal mass storage devices 625 and a network adapter 635. Internal mass storage devices 625 may be or may include any conventional medium for storing large volumes of instructions and data 630 in a non-volatile manner, such as one or more magnetic or optical based disks. The stored may include, but is not limited to, data that is developed for a computer software project by one or more developers. The network adapter 635 provides the computer system 600 with the ability to communicate with remote devices, over a network 640 and may be, for example, an Ethernet adapter.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
   receiving a new component for a software program;
   storing the new component in an inactive state in an inactive workspace, the inactive state being a state in which the new component has not passed a build and stability test yet;
   building a new version of the software program from the new component stored in the inactive workspace and from one or more active components of the software program that are in an active workspace, the new version being built in the inactive workspace;
   based on the building of the new version being successful, testing for stability, in the inactive workspace; and
   in response to the testing of the new version being successful, automatically saving the new version in a first build space and automatically moving the new component from the inactive workspace into the active workspace;
   periodically building a consolidated version of all active components for the software program separate from the building and testing steps, the periodic building further performs:
   testing the consolidated version of the software program, based on the testing being successful, storing the consolidated version in a second build space.

2. The method of claim 1, wherein the building of the new version is performed according to a predetermined schedule.

3. The method of claim 1, wherein the new component is transferred from a developer.

4. The method of claim 3, wherein the developer is to perform a local build and a local test of the new component prior to transferring the component.

5. The method of claim 3, further comprising receiving one or more tests from the developer, wherein the testing of the new version is based at least in part on the tests received from the developer.

6. The method of claim 5, further comprising automatically notifying a first responsible party based on the building of the new version not being successful.

7. The method of claim 6, further comprising automatically notifying a second responsible party based on the testing of the new version not being successful.

8. A code development system comprising:
   a processor;
   a design storage module including an inactive workspace and an active workspace, the inactive workspace to receive a new software component and being where the new software component is held, the active workspace to hold one or more active software components that have been successfully build and tested, the new software component being in an inactive state indicating that the new software has not passed a build and stability test yet;
   a build machine module to build- a new version of software from the new software component held in the inactive workspace and from at least one of the one or more active software components held in the active workspace of the design storage module, the new version being built in the inactive workspace; and
   a change management service module to:
      manage the design storage module and the build machine module, and
      in response to the build of the new version being successful, conduct a test for stability of the new version of software built from the new software component held in the inactive workspace and from the at least one of the one or more software components held in the active workspace,
      in response to the testing of the new version being successful, automatically save the new version in a first build space and automatically move the new component from the inactive workspace into the active workspace,
      periodically building using the processor a consolidated version using all software components from the active workspace separate from the building and testing steps, the periodical build further includes a test of the consolidated version of the software program and, based on the test being successful, storing the consolidated version in a second build space.

9. The system of claim 8, wherein a software build module is to build a first software version using a first software component in the inactive workspace and a second workspace module from the active workspace.

10. The system of claim 8, wherein the change management system is to automatically notify a responsible party based on a software build being unsuccessful or based on a test of a software build being unsuccessful.

11. A non-transitory machine-readable medium in communication with at least one processor, the non-transitory machine-readable storage medium storing instructions, which when executed by the at least one processor of a machine, cause the machine to perform operations comprising:

receiving a new component for a software program;

storing the new component in an inactive state in an inactive workspace, the inactive state being a state in which the new component has not passed a build and stability test yet;

building a new version of the software program from the new component stored in the inactive workspace and from one or more active components of the software program that are in an active workspace, the new version being built in the inactive workspace;

based on the building of the new version being successful, testing for stability, in the inactive workspace; and in response to the testing of the new version being successful, automatically saving the new version in a first build space and automatically moving the new component from the inactive workspace into the active workspace;

periodically building a consolidated version of all active components for the software program separate from the building and testing steps, the periodic building further performs:

testing the consolidated version of the software program, based on the testing being successful, storing the consolidated version in a second build space.

12. The non-transitory machine-readable medium of claim 11, wherein the operations further comprises:

automatically notifying a first responsible party based on the building of the new version not being successful.

13. The non-transitory machine-readable medium of claim 12, wherein the operations comprises:

automatically notifying a second responsible party based on the testing of the new version not being successful.

* * * * *